United States Patent [19]

Tokutomi et al.

[11] Patent Number: 5,344,709
[45] Date of Patent: Sep. 6, 1994

[54] SILICON CARBIDE FIBER AND METHOD OF MANUFACTURING THE SAME

[75] Inventors: Atsuya Tokutomi, Yokosuka; Hiroshi Ichikawa; Kenji Ushikoshi, both of Yokohama; Hiroshi Yamauchi, Tokyo, all of Japan

[73] Assignee: Nippon Carbon Co., Ltd., Tokyo, Japan

[21] Appl. No.: 884,058

[22] Filed: May 14, 1992

Related U.S. Application Data

[63] Continuation of Ser. No. 622,136, Dec. 5, 1990, abandoned, which is a continuation of Ser. No. 366,706, Jun. 15, 1989, abandoned.

[30] Foreign Application Priority Data

Jun. 15, 1988 [JP] Japan ................... 63-147545

[51] Int. Cl.$^5$ .................... B32B 9/00; D02G 3/00
[52] U.S. Cl. .................... 428/368; 428/367; 428/375; 427/249
[58] Field of Search ............ 428/367, 368, 378, 395; 427/249

[56] References Cited

U.S. PATENT DOCUMENTS

| | | | |
|---|---|---|---|
| 3,949,106 | 4/1976 | Araki et al. | 427/249 |
| 4,194,027 | 3/1990 | Adams et al. | 427/249 |
| 4,340,636 | 7/1982 | Debolt | 428/368 |
| 4,748,079 | 5/1988 | Thebault | 428/378 |
| 4,825,049 | 4/1989 | Rickborn | 427/249 |

FOREIGN PATENT DOCUMENTS 0269284 6/1988 European Pat. Off. .
2640258 6/1990 France .

OTHER PUBLICATIONS

American Ceramic Society Bulletin, vol. 66, No. 2, Feb. 1987, pp. 368, 372, A. J. Caputo et al, "Fiber-Reinforced SiC Composites With Improved Mechanical Properties".

*Primary Examiner*—Patrick J. Ryan
*Assistant Examiner*—J. M. Gray
*Attorney, Agent, or Firm*—Armstrong, Westerman, Hattori, McLeland & Naughton

[57] ABSTRACT

A silicon carbide fiber having low specific electric resistance and excellent mechanical properties and a method for manufacturing the fiber.

The silicon carbide fiber is characterized in that an amorphous carbon film is formed on the surface thereof. The fiber is manufactured by heating an antimelt-treated polycarbosilane fiber at a temperature not exceeding 1000° C. in an inert gas atmosphere followed by heating at a temperature of greater than 1000° C. and up to 1500° C. in an atmosphere of a mixture of hydrocarbon gas and inert gas.

2 Claims, 1 Drawing Sheet under the registered trademark name of "NICALON", said NICALON fiber being chiefly composed of fine crystals of $\beta$-SiC. In addition, the silicon carbide fiber of the present invention has an amorphous carbon film formed on the surface thereof and measures generally 8–20 $\mu$m in diameter.

SILICON CARBIDE FIBER AND METHOD OF MANUFACTURING THE SAME

This application is a continuation of application Ser. No. 622,136 filed Dec. 5, 1990 now abandoned, which in turn is a continuation of application Ser. No. 366,706, filed Jun. 15, 1989, now abandoned.

BACKGROUND OF THE INVENTION

The present invention relates to a silicon carbide fiber having a low specific electric resistance value and excellent mechanical properties including high tensile strength and tensile modulus, and to a method of manufacturing the same.

There has been known heretofore a method of manufacturing a silicon carbide fiber comprising, for example, steps of spinning a polycarbosilane material into threads or yarns, heating the spun yarns at a temperature ranging between 50° C. and 400° C. in an oxidizing gas atmosphere to produce antimelt-treated fibers and heating said antimelt-treated fibers at a temperature of above 1000° C. and up to 1500° C. in an atmosphere of inert gas such as a nitrogen gas.

The silicon carbide fiber obtained as above can be made to have various specific electric resistance values by changing the heating condition in which the antimelt-treated fibers are further heated in an inert gas atmosphere. This silicon carbide fiber manufactured as above has excellent mechanical properties including high tensile strength of 200–350 kg/mm$^2$ and high tensile modulus of 18–25 t/mm$^2$ in its specific electric resistance range of $10^2$–$10^8$ ($\Omega$·cm).

However, a silicon carbide fiber so manufactured according to the foregoing method as to have a low specific electric resistance value such as $10^{-1}$–$10^2$ ($\Omega$·cm) has a problem that its tensile strength is lowered to 50–100 kg/mm$^2$ and its tensile modulus also is lowered to 5–10 t/mm$^2$.

Therefore, it is the object of the present invention to provide a silicon carbide fiber having a low specific electric resistance and excellent mechanical properties, thereby solving the above-mentioned problem.

SUMMARY OF THE INVENTION

A silicon carbide fiber manufactured according to the present invention is characterized in that an amorphous film is formed on the surface thereof. As for the manufacturing method thereof according to the present invention, it is characterized in that an antimelt-treated polycarbosilane fiber is heated at a temperature not exceeding 1000° C. in an atmosphere of inert gas and thereafter heated at a temperature of above 1000° C. and up to 1500° C. in an atmosphere of a mixture of hydrocarbon and inert gas.

A silicon carbide fiber according to the present invention comprises 55–60% by weight silicon and 28–33% by weight carbon and has the same internal composition as another silicon carbide fiber manufactured by Nippon Carbon K.K. and known under the registered trademark name of "NICALON", said NICALON fiber being chiefly composed of fine crystals of $\beta$-SiC. In addition, the silicon carbide fiber of the present invention has an amorphous carbon film formed on the surface thereof and measures generally 8–20 $\mu$m in diameter.

The thickness of the amorphous film formed on the surface of the fiber ranges approximately from 1 nm (nanometer) to 1 $\mu$m (micrometer).

The antimelt-treated polycarbosilane fibers are heated for 1 to 10 hours in an atmosphere of inert gas such as nitrogen gas, for example.

The hydrocarbon gas in the mixture gas used in the subsequent high-temperature heating treatment of said antimelt-treated fiber which has been heated as above can be, for example, a propane gas, butane gas, ethane gas, etc. while the inert gas can be nitrogen gas and argon gas, for example.

Then, the hydrocarbon content of the mixture gas can be varied according to the desired thickness of the amorphous carbon film to be formed on the surface of the fiber, said hydrocarbon content being generally in the range of 0.01 to 50 vol. %. The heating time during which the antimelt-treated fiber is heated in the mixture gas atmosphere can be also varied according to desired thickness of the film to be formed on the fiber and is generally 5 seconds to 6 hours.

Since the silicon carbide fiber of the present invention has an amorphous carbon film formed on the surface thereof, it has a lower specific electric resistance and yet maintains good mechanical properties including high tensile strength and high tensile modulus substantially equal to those of the conventional silicon carbide fiber mentioned above.

According to the silicon carbide fiber manufacturing method of the present invention, an amorphous carbon film is formed on the surface of the fiber by heating an antimelt-treated polycarbosilane fiber at a temperature not exceeding 1000° C. in an atmosphere of inert gas and then at a temperature of above 1000° C. and up to 1500° C. in an atmosphere of a mixture gas of hydrocarbon gas and inert gas.

BRIEF DESCRIPTION OF THE DRAWING

The drawing is a characteristic diagram showing relationships between specific electric resistance and tensile strength, of silicon carbide fibers.

DETAILED DESCRIPTION OF PREFERRED EMBODIMENTS

Figure 1:
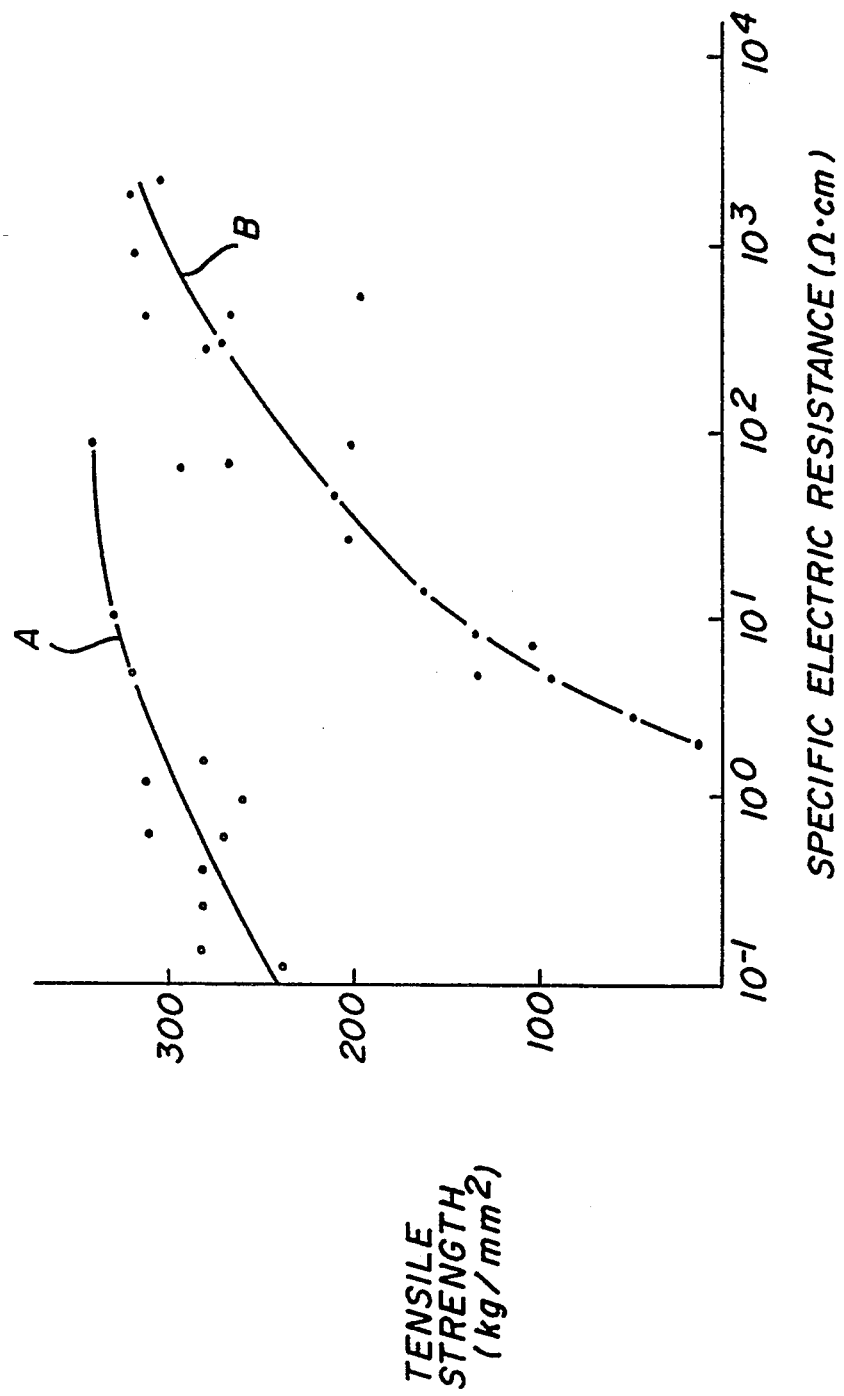

The present invention will now be explained in more detail by comparing embodiment examples of the present invention with pertinent comparative examples in the following.

EMBODIMENT EXAMPLE 1

Polycarbosilane (having an average molecular weight of 2000 and a melting point of 220° C.) was melted and spun, and then heated at 180° C. for one hour in atmospheric air for an antimelt treatment to obtain an antimelt-treated polycarbosilane fiber measuring 20 $\mu$m in diameter. This antimelt-treated polycarbosilane fiber was further heated at 1000° C. for 8 hours in a nitrogen gas atmosphere. The antimelt-treated polycarbosilane fiber so heated was then further heated at 1200° C. for 2 hours in an atmosphere of a mixture gas containing 0.5 vol. % of propane gas and 99.5 vol. % of nitrogen gas, thereby obtaining a silicon carbide fiber of the present invention.

The silicon carbide fiber manufactured according to the foregoing method was analyzed to determine its specific electric resistance, tensile strength, and tensile modulus. The results obtained are as shown in Table 1.

EMBODIMENT EXAMPLE 2

A silicon carbide fiber was manufactured in the same manner as in the EMBODIMENT EXAMPLE 1 above except for the final high-temperature heating treatment in which the mixture gas contained 10 vol. % of propane gas and 90 vol. % of nitrogen gas and the heating time was 3 hours.

Its specific electric resistance, tensile strength, and tensile modulus were measured in the same manner as in EMBODIMENT EXAMPLE 1. The results obtained are as shown in Table 1.

COMPARATIVE EXAMPLE 1

Polycarbosilane (having an average molecular weight of 2000 and a melting point of 220° C.) was melted and spun, and then heated at 180° C. in atmospheric air for an antimelt treatment to obtain an antimelt-treated polycarbosilane fiber measuring 20 μm in diameter. This antimelt-treated polycarbosilane fiber was further heated at 1200° C. in a nitrogen atmosphere for 8 hours to obtain a silicon carbide fiber.

Its specific electric resistance, tensile strength, and tensile modulus were measured in the same manner as in the above EMBODIMENT EXAMPLE 1. The results obtained are as shown in Table 1.

TABLE 1

|  | EMBODIMENT EXAMPLE 1 | EMBODIMENT EXAMPLE 2 | COMPARATIVE EXAMPLE 1 |
|---|---|---|---|
| Specific Electric Resistance (·cm) | $8 \times 10^{-1}$ | $8 \times 10^{-1}$ | $7.8 \times 10^{3}$ |
| Tensile Strength (kg/mm$^2$) | 310 | 290 | 300 |
| Tensile Modulus (t/mm$^2$) | 19.2 | 19.0 | 20 |

As is clear from Table 1 above, the silicon carbide fiber manufactured according to both of the EMBODIMENT EXAMPLES 1 and 2 of the present invention has a tensile strength and tensile modulus substantially equivalent to those of the silicon carbide fiber manufactured according to the conventional COMPARATIVE EXAMPLE 1 and yet has a lower specific electric resistance as compared with that of the latter.

EMBODIMENT EXAMPLE 3

Various silicon carbide fibers were manufactured in the same manner as in EMBODIMENT EXAMPLE 1 except that the heating temperature and time for the heat treatment in the mixture gas atmosphere were varied, each of said various silicon carbide fibers thus having a different specific electric resistance. Each of these silicon carbide fibers so obtained was measured for specific electric resistance and tensile strength in the same manner as in the EMBODIMENT EXAMPLE 1. The relationship between the specific electric resistance and tensile strength of each of said silicon carbide fibers on the basis of the results obtained is shown as curve A in the drawing.

COMPARATIVE EXAMPLE 2

Various silicon carbide fibers were manufactured in the same manner as in COMPARATIVE EXAMPLE 1 except that the heating temperature and time for the heat treatment applied to the antimelt-treated polycarbosilane fiber were varied, each of said various silicon carbide fibers thus having a different specific electric resistance. Each of these silicon carbide fibers so obtained was measured for specific electric resistance and tensile strength in the same manner as in EMBODIMENT EXAMPLE 1 above. Based on the results so obtained, the relationship between the specific electric resistance and tensile strength is as shown by curve B in the drawing.

As is clear from the drawing, it is confirmed that each of the silicon carbide fibers manufactured according to EMBODIMENT EXAMPLE 3 has a lower specific electric resistance and yet possesses a high tensile strength, whereas the tensile strength of a conventional silicon carbide fiber sharply decreased with a decrease in its specific electric resistance.

EMBODIMENT EXAMPLE 4

The silicon carbide fiber manufactured according to EMBODIMENT EXAMPLE 1 above was combined with an epoxy resin to manufacture a fiber-reinforced plastic having a 55% fiber content by volume and reinforced in two directions, 0°/90°. This fiber-reinforced plastic was then measured for relative dielectric constant, dielectric loss and tensile strength to produce the results as shown in Table 2.

Further, a two-layer electric wave absorber was prepared, which comprised an absorption layer made of this fiber-reinforced plastic and a surface layer made of a glass fiber-reinforced plastic composed of glass fiber and an epoxy resin. This two-layer wave absorber was measured for its wave absorption characteristic. The results thereof are as shown in Table 2.

For the wave absorption characteristic, return loss (dB) was measured in the entire microwave frequency range of 8–12 GHz.

COMPARATIVE EXAMPLE 3

The silicon carbide fiber manufactured according to COMPARATIVE EXAMPLE 1 above was combined with an epoxy resin to manufacture a fiber-reinforced plastic having a 55% fiber content by volume and reinforced in two directions, 0°/90°.

This fiber-reinforced plastic was measured for its relative dielectric constant, dielectric loss and tensile strength in the same manner as in EMBODIMENT EXAMPLE 4 above to obtain the results as shown in Table 2.

A two-layer electric wave absorber was then prepared, which comprised an absorption layer made of this fiber-reinforced plastic and a surface layer made of a glass fiber-reinforced plastic composed of glass fibers and an epoxy resin. The two-layer wave absorber was then measured for its wave absorption characteristic. The results obtained are as shown in Table 2.

TABLE 2

|  | EMBODIMENT EXAMPLE 4 | COMPARATIVE EXAMPLE 3 |
|---|---|---|
| Relative Dielectric Constant | 35 | 5.2 |
| Dielectric Loss | 1.2 | 1.2 |
| Tensile Strength (kg/mm$^2$) | 75 | 70 |
| Wave Absorption Characteristic (dB) | 20 | 4 |

As is apparent from Table 2 above, it is confirmed that the fiber-reinforced plastic using a silicon carbide fiber of the present invention can provide a superb tensile strength even when its relative dielectric constant and dielectric loss are 35 and 1.2 respectively.

It is also confirmed that the two-layer wave absorber having an absorption layer composed of the silicon carbide fiber of the present invention has an excellent wave absorption characteristic. Compared with the above-mentioned wave absorber, another two-layer wave absorber using an absorption layer composed of the conventional silicon carbide fiber showed a very poor wave absorption characteristic.

As seen from the foregoing, the silicon carbide fiber according to the present invention can find a wider field of industrial application including use as a fiber material for a fiber-reinforced plastic and for a wave absorption layer in a two-layer wave absorber.

EMBODIMENT EXAMPLE 5

The silicon carbide fiber manufactured according to EMBODIMENT EXAMPLE 1 above was combined with borosilicate glass to manufacture a fiber-reinforced glass ceramic having a 45% fiber content by volume and reinforced in one direction.

The fiber-reinforced glass ceramic so obtained was measured for its tensile strength and fracture toughness. The results obtained are as shown in Table 3.

COMPARATIVE EXAMPLE 4

The silicon carbide fiber manufactured according to COMPARATIVE EXAMPLE 1 was combined with borosilicate glass to manufacture a fiber-reinforced glass ceramic having a 45% fiber content by volume and reinforced in one direction.

The tensile strength and fracture toughness of this fiber-reinforced glass ceramic were measured in the same manner as in EMBODIMENT EXAMPLE 5 above to obtain the results also as shown in Table 3.

TABLE 3

|  | EMBODIMENT EXAMPLE 5 | COMPARATIVE EXAMPLE 4 |
|---|---|---|
| Tensile Strength ($kg/mm^2$) | 135 | 50 |
| Fracture Toughness ($MNm^{-3/2}$) | 30 | 10 |

As is clear from Table 3 above, it is confirmed that, as compared with a fiber-reinforced glass ceramic using a conventional silicon carbide fiber, one using the silicon carbide fiber of the present invention has an improved mechanical strength.

As described in the foregoing, the silicon carbide fiber according to the present invention has an amorphous carbon film formed on the surface thereof, so that it has not only a lower specific electric resistance but also a higher tensile strength and tensile modulus.

Further, according to the method of manufacturing the silicon carbide fiber, an antimelt-treated polycarbosilane fiber is heated at a temperature not exceeding 1000° C. in an atmosphere of inert gas and thereafter heated at a temperature of above 1000° C. and up to 1500° C. in an atmosphere of a mixture of hydrocarbon gas and inert gas so that a silicon carbide fiber having an amorphous carbon film formed on the surface thereof and possessing lower specific electric resistance and superb mechanical strength can be manufactured easily.

Accordingly, a fiber-reinforced plastic using the silicon carbide fiber of the present invention can make an electric wave absorber featuring a higher wave absorption characteristic and excellent mechanical strength. When combined with a ceramic, it never chemically reacts with the ceramic, so that there can be obtained a fiber-reinforced ceramic having greater strength and fracture toughness.

What is claimed is:

1. A silicon carbide fiber having an amorphous carbon film formed on the surface thereof, said silicon carbide fiber obtained by heating an antimelt-treated polycarbosilane thread at a temperature not exceeding 1000° C. in an atmosphere of inert gas and thereafter heating said thread at a temperature of above 1000° C. and up to 1500° C. in an atmosphere of hydrocarbon gas and inert gas wherein said hydrocarbon gas content is in the range of 0.01 to 50 vol. %, said silicon carbide fiber having a specific electric resistance of $10^{-1}$–$10^1$ $\Omega$·cm, a tensile strength of 200–350 $kg/mm^2$ and a tensile modulus of 18–25 $t/mm^2$.

2. The silicon carbide fiber of claim 1, wherein the thickness of the amorphous carbon film is 1 nm to 1 μm.

* * * * *